July 9, 1940.　　　　C. E. MAYNARD　　　　2,207,100
METHOD OF MAKING TIRE TREAD
Original Filed May 14, 1936　　2 Sheets-Sheet 1
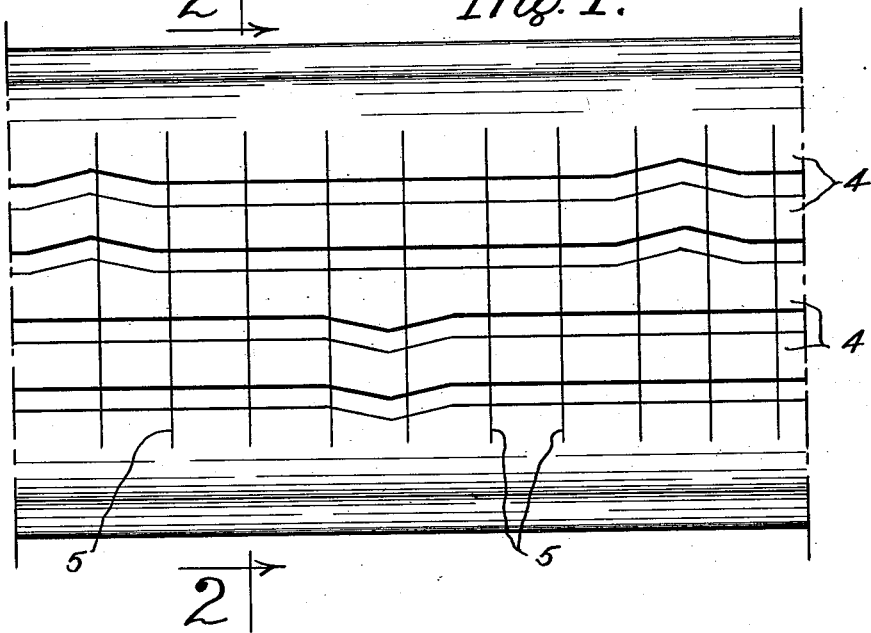
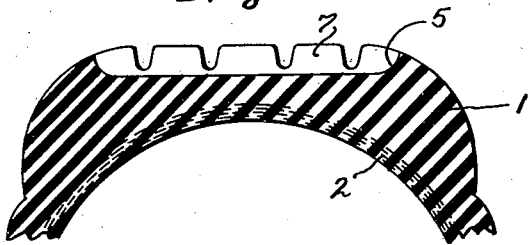
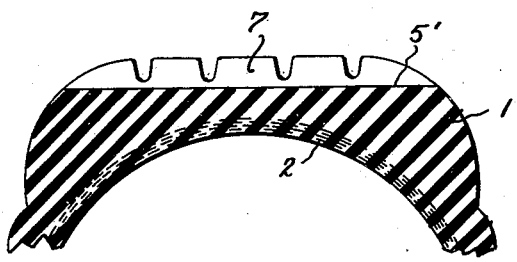
INVENTOR
CHARLES EDGAR MAYNARD
BY
Chapin & Neal
ATTORNEYS July 9, 1940.  C. E. MAYNARD  2,207,100

METHOD OF MAKING TIRE TREAD

Original Filed May 14, 1936   2 Sheets-Sheet 2

INVENTOR
CHARLES EDGAR MAYNARD
BY
Chapin & Neal
ATTORNEYS

Patented July 9, 1940

2,207,100

UNITED STATES PATENT OFFICE 2,207,100

METHOD OF MAKING TIRE TREAD

Charles Edgar Maynard, Northampton, Mass., assignor, by mesne assignments, to United States Rubber Company, New York, N. Y., a corporation of New Jersey Original application May 14, 1936, Serial No. 79,758. Divided and this application November 28, 1936, Serial No. 113,098

24 Claims. (Cl. 154—14)

This invention relates to rubber vehicle tires and their construction, and more particularly to the tread portion of such tires.

It is the principal object of the present invention to provide an economical and reliable method for the production of a tread, or tire having a tread, of the character disclosed and claimed in my copending application Serial No. 79,758, filed May 14, 1936, of which application this is a division.

Other and further objects will be apparent in the following specification and claims.

In the accompanying drawings which illustrate the invention—

Fig. 1 is a plan view of a portion of a tire tread made according to the invention;

Fig. 2 is a section taken substantially on line 2—2 of Fig. 1;

Fig. 3 is a view similar to Fig. 2 but showing a modification;

Figure 4:
Figs. 4 and 5 are diagrammatic longitudinal sectional views showing the first two steps in the general method.

It will be understood that the drawings are not to scale and parts such as the thickness of the gum strips used and the sectional width of the cut openings have been exaggerated for the sake of clearness. Both the sectional width and the thickness of the gum strip will in practice be very small.

It has previously been proposed, as a means of securing a non-skid tread, to mold and vulcanize the tread in the form of circumferential ribs and thereafter cut the ribs transversely to a depth approximately one-third of the depth of the ribs. This procedure is subject to a number of objections. Among these may be mentioned the fact that vulcanized rubber when cut is subject to chipping and tearing at the cut edges and there is a further tendency for the tread to crack at the bottom of the cuts. To minimize this tendency it has been necessary to limit the depth of cuts to approximately one-third of the depth of the rib, or other tread design element which may be used, with the result that the non-skid effect lasts only during one-third of the life of the tread. It is possible to subject the worn tread to a recutting operation, but this adds to the expense, and many purchasers rather than go to the bother of returning the tires for recutting will continue to run the tires with smooth ribs, with a consequent road hazard from skidding. A further objection lies in the fact that vulcanized rubber is difficult to cut and since the tire is complete at the time of the cutting operation, any imperfection or failure in the cutting results in the loss of the entire production cost of the tire.

As will be evident from the following specification, all of the above mentioned difficulties are overcome by my invention and many advantages obtained in improved operation, in quality, and uniformity of the product, and in manufacturing costs.

Referring to the drawings, 1 indicates generally the tread of a pneumatic tire, the tire carcass being conventionally indicated at 2 in Figs. 2 and 3. As shown, the tread design comprises circumferential ribs 4, but any suitable tread configuration may be used. The ribs and underlying portion of the tread are provided with a multiplicity of transverse cuts 5, see Figs. 1 and 2, which extend inwardly and downwardly from the tread shoulders. If preferred, the cuts may extend straight across through the shoulders, as indicated at 5' in Fig. 3.

According to my invention these cuts are formed in the tread portion of the tire, either before or after the tread is assembled on the carcass or after the carcass is expanded, but in any event before the tire is vulcanized. The cuts may be formed by means of any suitable knife. As will be later referred to, the knife may advantageously be heated or a heated wire may be used.

Figure 5:

Referring to Figs. 4 to 9 inclusive, the cuts 5 having been made in the unvulcanized tread, the tread is flexed as shown in Fig. 5, to open the cuts. This flexing may be done as a separate manipulation before or after the tread is placed on the tire. When the tires are constructed flat or semi-flat, the expansion of the tire from flat or semi-flat band form to tire shape serves to flex the cuts open.

Figure 6:
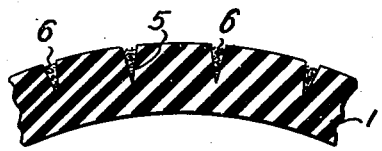
Figs. 6 and 7 are similar views showing one general form of procedure following the steps of Figs. 4 and 5.
Figure 8:
Figs. 8 and 9 are similar views showing an alternative form of procedure following the steps of Figs. 4 and 5.
Figure 7:

Figs. 6 and 8 illustrate two alternative procedures from this point. As illustrated in Fig. 6, I propose to fill the opened cut with a lubricating material such as powdered or liquid soapstone, as indicated at 6. When the flexing force is released, or partially released, see Fig. 7, sufficient soapstone is gripped and held in the cut to prevent joining of the sides of the cut during the subsequent vulcanizing. The tire casing is vulcanized under internal fluid pressure and the walls of the cuts are pressed closely together, with only a relatively thin film of lubricant between. As a result, a practically closed cleft with molded vulcanized sides is produced. The fact that all surfaces are "molded" vulcanized surfaces, as indicated at 7 in Figs. 2 and 3, instead of "cut" surfaces as in the prior practice, prevents chipping of the edges or splitting at the bottom so that the clefts may be carried, as shown, below the depth of the ribs so that the non-skid function of the clefts continues throughout the life of the tread.

Figure 9:
Figure 10:
Figs. 10 and 11 are respectively sectional views of two forms of gum strip.
Figure 11:

A modified procedure, and in some ways the preferable one, is shown in Figs. 8 and 9. With the cuts 5 flexed open, as shown in Fig. 5, a strip of gum stock 8 is inserted in the cut. The gum stock may include sufficient pigment to give it a color the same as the tread or a contrasting color may be used. The gum strip may be rectangular in cross-section or may be given a cross-section such as shown at 8' and 8 in Figs. 10 and 11 respectively. Instead of gum stock, the cut may be filled with rubber cement, liquid latex, or a rubber dough, the essential feature being that the inserted rubber material shall be relatively soft, pliable, and deformable, as compared with the tread stock, when both have been vulcanized. It will be understood that the filler material bonds with the adjacent tread stock upon vulcanization but permits, because of the flexibility of the filler, relative movement between the blocks into which the "filled" clefts divide the ribs. In use the soft filler tends to wear faster than the tread and retreats as the tread wears, but the depth of the opened clefts so resulting is never great enough to afford lodgment to sand or stones. This freedom from the liability of picking up sand and stones comprises one important advantage of this form of my invention. A further advantage of this form is that the cutting and filling may be carried out as a continuous operation on a tread strip which is later cut to length in the usual manner for use in conventional building operations. Where a lubricant is used to form free walled clefts, as previously described, substantial care has to be used if the work is done on the tread in strip form to prevent lubricant coming in contact with the under side of the tread strip where its presence might prevent proper adhesion of the tread to the carcass. This danger is not present when the cuts are filled with gum or the like.

Figure 12:
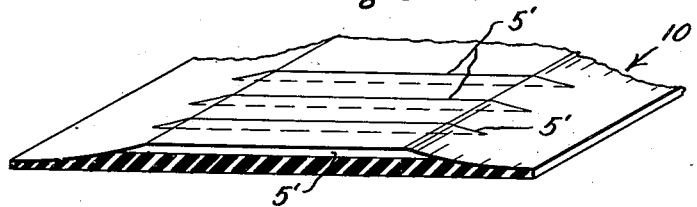
Fig. 12 is a perspective view of a tread strip embodying the invention.

In Fig. 12 a tread strip is shown in flat form, the cuts being shown at 5'. It will be understood that the cuts 5' may be made either before or after the strip has been cut to length and rubber inserts or lubricating material placed in the cuts either before or after such cutting to length and either before or after the tread length is placed on the tire carcass.

Figure 13:
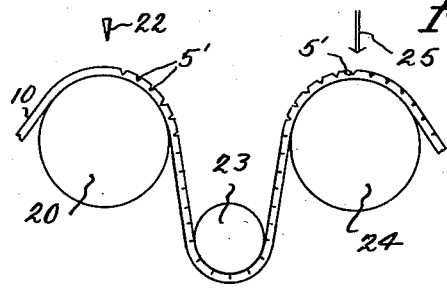
Fig. 13 is a diagrammatic view of means for carrying out the method as a substantially continuous operation.

Fig. 13 discloses diagrammatically one way of carrying out a continuous cutting and filling of a tread strip. As there shown, the tread strip 10 is guided around a roll 20, thus tensioning the outer surface. As it passes over and is bent around roll 20 a knife 22 cuts the strip to the desired depth to form cuts 5'. The strip then passes beneath a guide roll 23 and over a roll 24 which is of sufficiently small diameter to flex the strip and open the cuts 5' for the reception of the filler or a lubricating material, as indicated at 25.

The use of a heated knife or wire as a means for making the cuts has been mentioned above. The immediate effect of the heated knife or cutter is to soften the rubber and, if the gum strips are immediately inserted, bonding of the tread and gum stock surfaces is facilitated. The use of such cutting means may also be employed advantageously when it is desired to form open clefts, since the heat of the knife or wire has a tendency to start a superficial vulcanization if given time and opportunity, especially where high speed accelerators are used, thus aiding whatever lubricant is used in preventing adhesion of the walls of the clefts during subsequent vulcanization. The tendency of the sulphur in the rubber compound to bloom on the surface of the cuts also aids in preventing adhesion of the walls. If the cut treads are permitted to age, even for a comparatively short period before being vulcanized, the tendency of adhesion of the walls is lessened.

The cuts or clefts may be equally spaced about the circumference of the tire but preferably an unequal spacing is used to afford quiet operation.

It will be seen that whether the zones of separation between the independently acting portions of the ribs are constituted by open clefts or integral insets of soft rubber material, these zones are congenital with the tire tread and are, therefore, part of the tire as the latter is taken from the vulcanizing mold.

While the invention has been described as applied to a pneumatic tire, it may also be employed in the construction of solid or cushion tires.

I claim:

1. The method of constructing a tire casing which comprises forming a plurality of knife-like cuts transversely of the unvulcanized rubber strip which is to become the tread of the casing, flexing said strip to open said cuts, inserting material into said cuts to preserve at said cuts zones of relative movement and flexibility between the portions of the strip between the cuts, assembling the strip on the tire carcass in the usual manner and vulcanizing the casing in a conventional tire mold whereby said zones become congenital parts of the completed tire and impart increased flexibility to the tire tread as a whole.

2. The method of constructing a tire casing which comprises assembling the unvulcanized casing in conventional form including the tread portion, forming a plurality of spaced cuts extending transversely of the tread, flexing the casing to open the cuts, inserting material into said cuts to preserve zones of relative movement between the portions of the tread between the cuts, and vulcanizing the casing in a conventional tire mold whereby said zones become congenital parts of the completed tire.

3. The method of constructing a tire casing which comprises assembling the unvulcanized casing in a conventional manner as a band of less diameter than the tread diameter of the finished casing, forming a plurality of spaced cuts extending transversely of the tread, expanding the band to tire shape and thereby open the cuts, inserting material into said cuts to preserve zones of relative movement between the portions of the tread between the cuts, and vulcanizing the casing in a conventional tire mold whereby said zones become congenital parts of the completed tire.

4. A method of manufacturing pneumatic tires having the tread formed with cuts which impart to the tire anti-skidding properties, characterized by forming the cuts in the tread prior to the introduction of the tire into a vulcanizing mold and introducing into the cuts a medium which will prevent the walls of the cuts from sticking together during the operation of vulcanizing the tire in the mold, and thereafter introducing the tire into the mold and vulcanizing it therein.

5. A method as claimed in claim 4 wherein the cuts are formed in the tread of an already shaped tire.

6. A method as in claim 4, wherein the tire is built at least partially flat and subsequently shaped, the cuts being formed in the tire prior to the shaping operation.

7. A method as in claim 4 wherein a rubber strip to form the tread is first produced which is afterward applied to a carcass to form the complete tire and wherein the cuts are formed in the rubber strip prior to the application of the latter to the carcass.

8. A method as in claim 4 wherein the cuts extend only over the central portion of the width of the tread.

9. A method as in claim 4 wherein the anti-sticking medium is applied when the tread is in curved or bent condition with the cuts in consequence open.

10. The method of constructing a tire casing which comprises forming in a tread strip of homogeneous tough wear-resisting tread rubber, a plurality of transverse, circumferentially spaced knife-like cuts, inserting in said cuts material to maintain the walls of said cuts separated during the subsequent vulcanizing of the tire, applying said tread strip to a tire carcass to form the tread portion of the casing and thereafter introducing the casing into a mold and vulcanizing it therein.

11. The method of constructing a tire casing which comprises forming a plurality of knife-like cuts transversely of the unvulcanized homogeneous strip of tough wear-resisting tread rubber which is to become the tread of the casing, flexing the strip to open said cuts, inserting therein a rubber material to prevent complete closure of the cut upon release of the strip and which will be more flexible after vulcanization than the body of the tread after the latter is vulcanized, assembling the strip on the tire carcass in the usual manner and vulcanizing the casing in a conventional tire mold whereby said inserted rubber material becomes integrally bonded with the adjacent body of the tread to form flexible insets permitting independent movement of the tread portions intermediate said insets.

12. The method of constructing a tire casing which comprises forming a plurality of knife-like cuts transversely of the unvulcanized homogeneous strip of tough wear-resisting tread rubber which is to become the tread of the casing, inserting in said cuts a thin strip of homogeneous rubber material which will be more flexible after vulcanization than the body of the tread after the latter is vulcanized, assembling the strip on the tire carcass and vulcanizing the casing.

13. The method of constructing a tire casing which comprises forming a plurality of knife-like cuts in the unvulcanized homogeneous strip of tough wear-resisting tread rubber which is to become the tread of the casing, inserting in said cuts a rubber material which will be more flexible after vulcanization than the tread body of the tread after the latter is vulcanized, the amount of material inserted being sufficient to maintain the walls of the cuts out of contact and permit relative movement thereof but insufficient to cause the inserted material to wear substantially below the surface of the adjacent tread rubber in service, assembling the strip on the tire carcass and vulcanizing the casing whereby the inserted material becomes bonded with the adjacent body of the tread.

14. The method of constructing the tread portion of a tire casing which comprises forming a plurality of knife-like cuts in an unvulcanized homogeneous strip of tough wear-resisting tread rubber, applying tension to the cut portion of the tread to spread the cuts, inserting in said cuts a rubber material less wear-resisting but more flexible than the rubber forming the body of the strip when both are vulcanized and releasing the tension on the strip.

15. The method of constructing the tread portion of a tire casing which comprises forming a plurality of knife-like cuts in an unvulcanized homogeneous strip of tough wear-resisting tread rubber, applying tension to the cut portion of the tread to spread the cuts, inserting in said cuts a rubber material less wear-resisting but more flexible than the rubber forming the body of the strip when both are vulcanized, the amount of the material inserted being sufficient to maintain the walls of the cuts out of contact and permit relative movement thereof but insufficient to cause the inserted material to wear substantially below the surface of the adjacent tread rubber in service.

16. The method of constructing a tire casing which comprises flexing the unvulcanized homogeneous strip of tough wear-resisting tread rubber which is to become the tread of the tire to place the outer surface under tension, forming cuts in the so tensioned strip, inserting in said cuts a more flexible less wear-resisting rubber material than that forming the body of the strip and possessing sufficient immobility when heated to vulcanizing temperature and subject to molding pressure to retain its location in said cuts, releasing the tread strip from tension, assembling the strip on a tire carcass and vulcanizing the tire.

17. The method of constructing a tire tread which comprises forming a plurality of cuts in the tough wear-resisting rubber body of the tread while the latter is unvulcanized, filling said cuts with a more flexible less wear-resisting rubber material than that forming the body of the tread and which possesses sufficient immobility when heated to vulcanizing temperature and subjected to molding pressure to retain its location in said cuts, and vulcanizing the so formed tread.

18. The method of constructing a tire casing which comprises forming a plurality of knife-like cuts in an unvulcanized homogeneous strip of tough wear-resisting tread rubber, inserting in said cuts a vulcanizable material which will be more flexible and deformable after vulcanization than the tread rubber after the latter is vulcanized, assembling the strip on a tire carcass and vulcanizing the completed casing whereby the inserted material becomes permanently bonded with the adjacent body of the tread.

19. The method of constructing a tire casing which comprises forming a plurality of knife-like cuts transversely of an unvulcanized homogeneous strip of tough wear-resisting tread rubber, inserting in said cuts a vulcanizable material which will be more flexible and deformable after vulcanization than the tread rubber after the latter is vulcanized, assembling the strip on a tire carcass and vulcanizing the completed casing in a mold to form open circumferential grooves in the tread portion of the tire.

20. The method of constructing a tire casing which comprises forming a plurality of knife-like cuts transversely of an unvulcanized homogeneous strip of tough wear-resisting tread rubber, inserting in said cuts a vulcanizable material which will be more flexible and deformable after vulcanization than the tread rubber after the latter is vulcanized, assembling the strip on a tire carcass and vulcanizing the completed casing in a mold to form open circumferential grooves in the tread portion of the tire of less height than the depth of the cuts made in the unvulcanized tread strip so that the material inserted in the cuts will penetrate the tire tread to a depth below the open grooves molded in the tread.

21. The method of constructing a rubber tire tread which comprises forming a plurality of cuts in the tough wear-resisting rubber of the tread while the latter is unvulcanized, filling said cuts with a vulcanizable material which will be more flexible and deformable after vulcanization than the tread rubber after the latter is vulcanized, and vulcanizing the tread.

22. The method of constructing a tire casing which comprises, bending a homogeneous strip of unvulcanized tough wear-resisting tread rubber longitudinally to place the outer portion under tension, forming knife-like cuts in the so tensioned strip, transversely thereof, by means of a heated knife, inserting edgewise in the cuts, while the walls of the latter are tacky from the heat of the knife, ribbon-like strips having a width substantially equal to the depth of the cuts, formed of an unvulcanized homogeneous rubber material which will be more flexible, deformable and less wear-resisting after vulcanization than the tread rubber after the latter is vulcanized, releasing the tread from tension to cause the ribbon-like strips to be gripped between the tacky walls of the cuts, placing the so formed composite strip on a tire carcass and vulcanizing the completed casing in a mold to form open circumferential grooves in the tread portion of the tire.

23. The method of constructing the tread portion of a tire casing which comprises, bending a homogeneous strip of unvulcanized tough wear-resisting tread rubber longitudinally to place the outer portion under tension, forming knife-like cuts in the so tensioned strip, transversely thereof, by means of a heated knife, inserting edgewise in the cuts, while the walls of the latter are tacky from the heat of the knife, ribbon-like strips having a width substantially equal to the depth of the cuts, formed of an unvulcanized homogeneous rubber material which will be more flexible, deformable and less wear-resisting after vulcanization than the tread rubber after the latter is vulcanized, releasing the tread from tension to cause the ribbon-like strips to be gripped between the tacky walls of the cuts, placing the so formed composite strip on a tire carcass and vulcanizing the completed casing in a mold to form open circumferential grooves in the tread portion of the tire, of less height than the depth of the cuts made in the unvulcanized tread strip so that the material inserted in the cuts will penetrate the tire tread to a depth below the open grooves molded in the tread by the ribs.

24. The method of preparing the tread portion of a tire casing for application to a tire carcass which comprises, forming a plurality of cuts in a homogeneous strip of unvulcanized, tough wear-resisting tread rubber, filling each of said cuts by inserting edgewise therein ribbons of an unvulcanized but vulcanizable material which will be more flexible and deformable but less wear-resisting after vulcanization than the tread rubber after the latter is vulcanized.

CHARLES EDGAR MAYNARD.